US012179208B2

(12) United States Patent
Kovacs et al.

(10) Patent No.: US 12,179,208 B2
(45) Date of Patent: Dec. 31, 2024

(54) FLOW CELL RECEIVER AND METHODS OF USE

(71) Applicant: Singular Genomics Systems, Inc., San Diego, CA (US)

(72) Inventors: Sandor Kovacs, Middletown, DE (US); David Baranson, Encinitas, CA (US); Eli N. Glezer, Del Mar, CA (US)

(73) Assignee: Singular Genomics Systems, Inc., San Diego, CA (US)

( * ) Notice: Subject to any disclaimer, the term of this patent is extended or adjusted under 35 U.S.C. 154(b) by 0 days.

(21) Appl. No.: 18/483,259

(22) Filed: Oct. 9, 2023

(65) Prior Publication Data

US 2024/0058821 A1 Feb. 22, 2024

Related U.S. Application Data

(63) Continuation of application No. 17/963,377, filed on Oct. 11, 2022, now Pat. No. 11,813,615, which is a continuation of application No. 17/105,337, filed on Nov. 25, 2020, now Pat. No. 11,498,078.

(60) Provisional application No. 62/952,790, filed on Dec. 23, 2019.

(51) Int. Cl.
*B01L 9/00* (2006.01)

(52) U.S. Cl.
CPC ......... *B01L 9/527* (2013.01); *B01L 2200/025* (2013.01); *B01L 2200/027* (2013.01); *B01L 2300/168* (2013.01); *B01L 2300/18* (2013.01)

(58) Field of Classification Search
CPC ......... B01L 2200/025; B01L 2200/027; B01L 2200/0689; B01L 2300/168; B01L 2300/18; B01L 2300/1822; B01L 2300/1844; B01L 3/502715; B01L 9/527
See application file for complete search history.

(56) References Cited

U.S. PATENT DOCUMENTS

| | | | |
|---|---|---|---|
| 5,641,658 | A | 6/1997 | Adams et al. |
| 7,057,026 | B2 | 6/2006 | Barnes et al. |
| 7,115,400 | B1 | 10/2006 | Adessi et al. |
| 7,541,444 | B2 | 6/2009 | Milton et al. |
| 7,790,418 | B2 | 9/2010 | Mayer |
| 8,003,354 | B2 | 8/2011 | Shen et al. |
| 8,039,817 | B2 | 10/2011 | Feng et al. |
| 8,241,573 | B2 | 8/2012 | Banerjee et al. |

(Continued)

FOREIGN PATENT DOCUMENTS

| | | |
|---|---|---|
| WO | WO-2004/018497 A2 | 3/2004 |
| WO | WO-2004/018497 A3 | 6/2004 |

(Continued)

OTHER PUBLICATIONS

Bentley, D. R. et al. (Nov. 6, 2008). "Accurate whole human genome sequencing using reversible terminator chemistry," *Nature* 456(7218): 53-59.

(Continued)

*Primary Examiner* — Jennifer Wecker
*Assistant Examiner* — Jonathan Bortoli
(74) *Attorney, Agent, or Firm* — Mintz, Levin, Cohn, Ferris, Glovsky, Popeo, P.C.; Zachary L. Terranova

(57) ABSTRACT

The present disclosure relates to a flow cell receiver. The flow cell receiver can include at least one platen, having a plurality of ports. The flow cell receiver can include magnets. The flow cell receiver can be configured to automatically align, secure, and retain a flow cell carrier containing a flow cell.

20 Claims, 10 Drawing Sheets

(56) References Cited

U.S. PATENT DOCUMENTS

| | | | |
|---|---|---|---|
| 8,951,781 | B2 | 2/2015 | Reed et al. |
| 9,937,497 | B2 | 4/2018 | Eltoukhy et al. |
| 10,738,072 | B1 | 8/2020 | Graham et al. |
| 11,498,078 | B2 | 11/2022 | Kovacs et al. |
| 11,813,615 | B2 | 11/2023 | Kovacs et al. |
| 2008/0009420 | A1 | 1/2008 | Schroth et al. |
| 2008/0038163 | A1 | 2/2008 | Boege et al. |
| 2008/0219890 | A1 | 9/2008 | Lawson et al. |
| 2009/0026082 | A1 | 1/2009 | Rothberg et al. |
| 2010/0111768 | A1 | 5/2010 | Banerjee et al. |
| 2011/0059865 | A1 | 3/2011 | Smith et al. |
| 2012/0270305 | A1 | 10/2012 | Reed et al. |
| 2016/0289669 | A1 | 10/2016 | Fan et al. |
| 2018/0327832 | A1 | 11/2018 | Ramirez et al. |
| 2019/0054471 | A1 | 2/2019 | Williams et al. |
| 2019/0056415 | A1 | 2/2019 | Lai et al. |
| 2019/0091696 | A1 | 3/2019 | Vollenweider et al. |
| 2021/0031186 | A1 | 2/2021 | Eberwine et al. |
| 2021/0190668 | A1 | 6/2021 | Kovacs et al. |

FOREIGN PATENT DOCUMENTS

| | | |
|---|---|---|
| WO | WO-2007/123744 A2 | 11/2007 |
| WO | WO-2007/123744 A3 | 11/2008 |

OTHER PUBLICATIONS

HiSeq 2500 System Guide v2 (Mar. 2018). Document No. 15035786, pp. 1-96.

Hyper Physics Article: Magnets and Electromagnets located at <http://hyperphysics.phy-astr.gsu.edu/hbase/magnetic/elemag.html> last accessed Jan. 8, 2024.

Margulies, M. et al. (Sep. 15, 2005, e-published Jul. 31, 2005). "Genome sequencing in microfabricated high-density picolitre reactors," *Nature* 437(7057): 376-380.

MiSeq System Guide v0 (Jul. 2018). Document No. 1000000061014, pp. 1-63.

Pourmand, N. et al. (Apr. 25, 2006, e-published Apr. 13, 2006). "Direct electrical detection of DNA synthesis," *PNAS USA* 103(17): 6466-64 70.

Shendure, J. et al. (Sep. 9, 2005, e-published Aug. 4, 2005). "Accurate multiplex polony sequencing of an evolved bacterial genome," *Science* 309(5741): 1728-1732.

Southern, E. et al. (Jan. 1999). "Molecular interactions on microarrays," *Nat Genet* 21(1 Supply): 5-9.

FLOW CELL RECEIVER AND METHODS OF USE

CROSS-REFERENCES TO RELATED APPLICATIONS

This application is a continuation of U.S. patent application Ser. No. 17/963,377, filed Oct. 11, 2022, which is a continuation of U.S. patent application Ser. No. 17/105,337, filed Nov. 25, 2020, now U.S. Pat. No. 11,498,078, which claims the benefit of U.S. Provisional Application No. 62/952,790, filed Dec. 23, 2019, each of which is incorporated herein by reference in their entirety and for all purposes.

BACKGROUND

A tremendous interest in nucleic acid characterization tools was spurred by the mapping and sequencing of the human genome. New tools were needed to cope with the unprecedented amount of genomic information that was being discovered. One such tool that emerged were DNA microarrays; tiny gene-based sensors traditionally prepared on coated glass microscope slides (Southern E., Mir K., and Shchepinov M.; Nature Genetics volume 21, p. 5-9 (1999)). Typically, a DNA microarray consists of a flat, solid substrate (typically glass) with an organic coating, typically an organo-functional alkoxysilane. The coated glass is then grafted with various known DNA probes at predefined locations. Standard 25 mm×75 mm glass microscope slides were the first supports commonly used for these initial microarray assays, which then gave way to the modern flow cell.

Broadly speaking, for nucleic acid sequencing applications, a flow cell may be considered a reaction chamber that contains a nucleic acid template tethered to a solid support, to which nucleotides and ancillary reagents are iteratively applied and washed away. The flow cell allows for imaging of the sites at which the nucleic acids are bound, and resulting image data is used for the desired analysis. The latest commercial sequencing instruments use flow cells and massive parallelization to increase sequencing capacity.

The desire to perform high throughput sequencing stems from the need for faster processing and reduced costs. Since the debut of the modern flow cell (Margulies et al; Nature. 2005 Sep. 15; 437(7057):376-80. 2005), improvements to sequencing flow cells tend to focus on optimizing spacing patterns and uniform well size as a means to improve sequencing quality and efficiency. In addition to these improvements, there is a general need for a more user-friendly, ergonomically minded, flow cell that reduces costs relative to other known systems and also increases control and efficiency of the reactions intended to be observed. There is, therefore, a continued need for improved methods and devices for sequencing nucleic acid in order to address the practical day-to-day sequencing work of the average scientist.

BRIEF SUMMARY

In an aspect, a flow cell receiver is provided. The flow cell receiver includes at least one platen. Each of the at least one platens includes one or more (e.g., a plurality) of vacuum ports, a plurality of input ports, and a plurality of output ports. The flow cell receiver includes a plurality of magnets. The flow cell receiver is configured to align, secure, and retain a flow cell carrier containing a flow cell. In embodiments, the flow cell receiver includes one platen. In embodiments, the flow cell receiver includes two platens. In embodiments, the flow cell receiver includes three platens. In embodiments, the flow cell receiver includes four platens.

In some embodiments, securing and retaining does not require any additional fixation mechanism beyond the vacuum ports. The one or more (e.g., the plurality) of vacuum ports can be configured to provide sufficient vacuum pressure to ensure maximum physical contact between the flow cell and the at least one platen. The plurality of magnets can be oriented to complete a magnetic field loop with constructive interference. The plurality of magnets aligns the flow cell and the flow cell carrier to the flow cell receiver, and the vacuum pressure can prevent movement of the flow cell within the flow cell carrier when the flow cell receiver is in motion. The at least one platen can further include a light absorbing coating. The at least one platen can further include an anti-reflective coating.

In another interrelated aspect, a method of securing a flow cell carrier in a flow cell receiver as described and illustrated herein, including embodiments, is provided. The method includes placing the flow cell carrier on the at least one platen, aligning the flow cell carrier with the plurality of magnets, and engaging the plurality of vacuum ports. The securing is configured to constrain six degrees of freedom of the flow cell carrier. Constraining is used in accordance with its ordinary meaning in the art and refers to partially restricted movement or complete immobilization.

In an aspect is provided a microfluidic device including a flow cell receiver (e.g., a flow cell receiver as described herein).

DETAILED DESCRIPTION

The present disclosure describes a flow cell receiver system and methods that provide improvements for sequencing nucleic acid in order to address the practical day-to-day sequencing work of the average scientist. In an aspect, there is provided a flow cell receiver (FCR) capable of aligning, securing, and/or retaining a flow cell carrier and accompanying flow cell, referred to collectively as FC, without using additional securing devices such as clamps, clips, screws, or latches. The FCR can use securing, alignment and stabilization components, such as one or more magnets and one or more vacuum ports (e.g., a vacuum port array), to automatically align, latch, and retain the FC in a proper location and orientation within a sequencing device or similar instrument. In embodiments, the FCR further includes a "fascia plate", or cover, that hides fasteners, magnets, circuit boards, and similar delicate components, protecting them from dust and/or human contact, and providing visual appeal.

Figure 1:
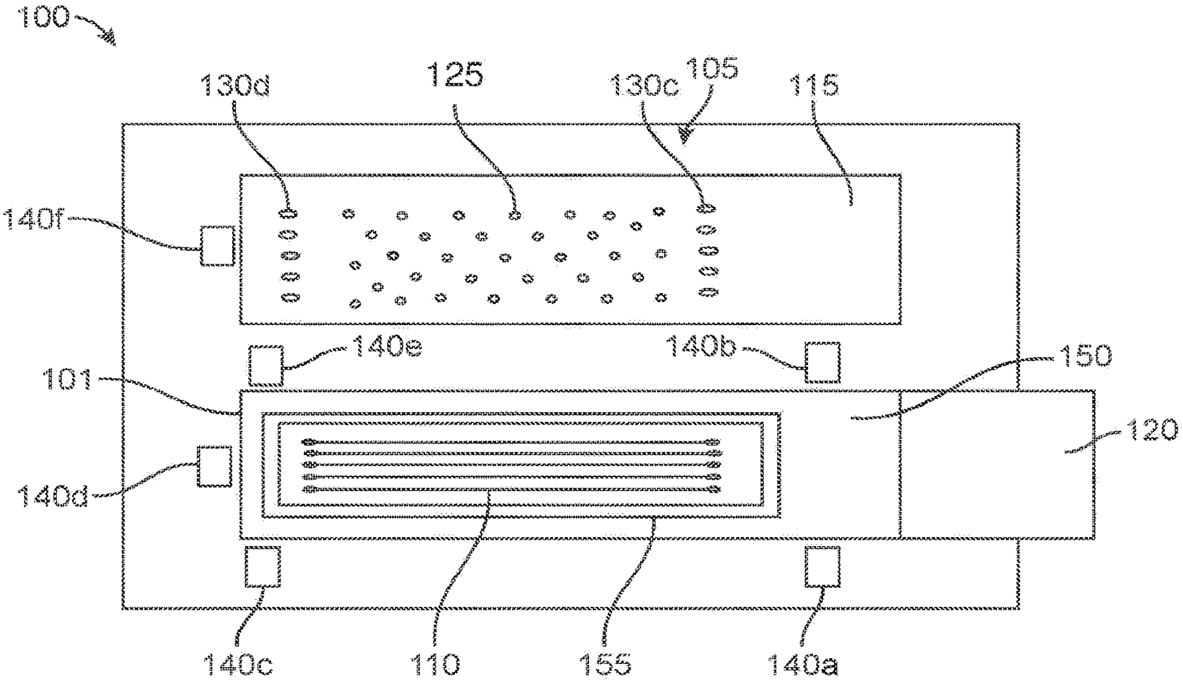
FIG. 1 is a schematic block diagram of an embodiment of a flow cell receiver consistent with implementations of the current subject matter. For example, the schematic includes a flow cell receiver including at least one platen.

FIG. 1 is a schematic block diagram of an embodiment of a flow cell receiver (FCR) 100. The FCR 100 can include a flat surface 105 or other support structure. The flat surface 105 can include at least one platen 115 on which a flow cell assembly (FC) 101 can sit. The FC 101 can include a handle 120, a frame 150, and a pocket 155 within the frame 150, configured to retain a flow cell 110. In embodiments, the handle 120 can be an ergonomic handle. In embodiments, the pocket 155 can be configured to retain the flow cell 110 by constraining multiple degrees of freedom, such as one or more of six degrees of freedom, of the flow cell 110. An example flow cell assembly 110 is described in U.S. Provisional Patent Application No. 62/952,787, entitled "FLOW CELL CARRIER AND METHODS OF USE", which is incorporated herein by reference in its entirety. In embodiments, the FC is secured in the flow cell receiver such that a maximal surface area of the flow cell is available to be exposed to an optical lens (e.g., the optical lens of a nucleic acid sequencing device). The optical lens (e.g., the optical lens of the sequencing device) can be configured to detect excitation, emission, or other signals present on the flow cell. In embodiments, the FC can be configured to retain the flow cell such that a maximal surface area of the flow cell can be available to be in contact with the receiver of a nucleic acid sequencer (e.g., the platen 115). The FCR 100 may hold the FC 101 in a desired orientation to facilitate the flow of fluid through the flow cell and/or imaging of the flow cell.

Figure 2A:
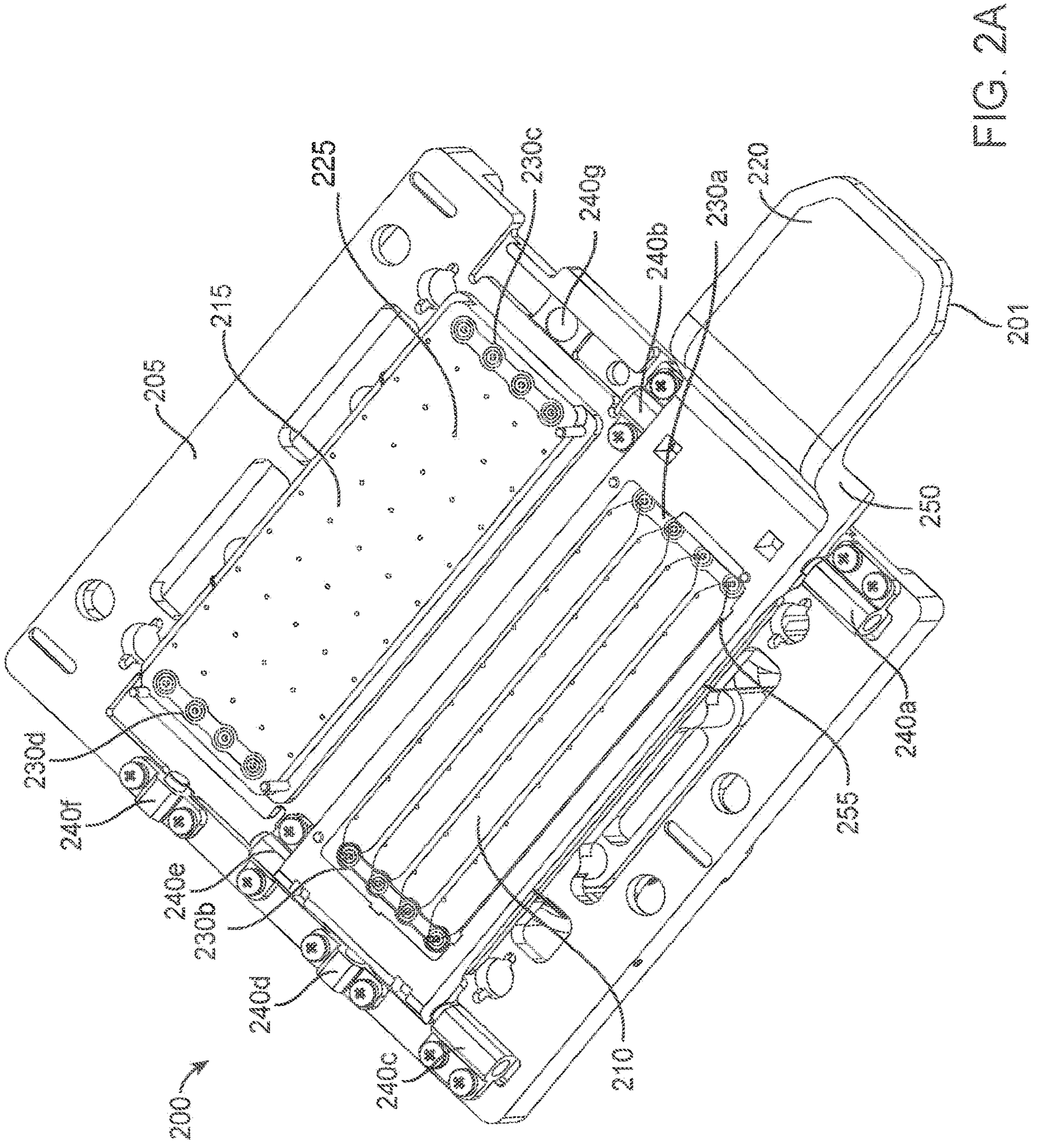
FIG. 2A is a top perspective view of another embodiment of a flow cell receiver consistent with implementations of the current subject matter.

As shown in FIG. 1 and FIG. 2A, the FC 101 is oriented relative to the X, Y, and Z-axes. The flow cell 110 is configured to hold a sample-of-interest (e.g., a nucleic acid) in a flow channel. The flow cell 110 may be in fluid communication with a fluidic system (not shown) that is configured to deliver reagents to the sample in the flow channel. In embodiments, the sample may provide detectable characteristics (e.g., through fluorescence or chemiluminescence) after desired reactions occur, such as nucleotide incorporation and detection. In embodiments, the flow cell 110 may have one or more sample areas or regions (i.e., areas or regions where the sample is located) from which optical signals are emitted. In embodiments, the flow cell 110 may also be used to generate the sample for performing a biological or chemical assay. For example, the flow cell 110 may be used to generate the clusters of DNA before a sequencing protocol is performed.

In an embodiment, the FC 101 can be held in a proper location and orientation on the platen by a one or more securing elements that exert a force onto the FC 101 to retain it in place. The type of force can vary. For example, the securing elements can be one or more magnets, 140*a*-140*f* positioned to interact with the FC 101. The at least one platen 115 can also include a plurality of vacuum ports 125 configured to generate force, via a pressure differential, sufficient to hold the FC 101 in the proper location and orientation on the at least one platen 115. In embodiments, the FC 101 is held in the proper location and orientation by constraining all six degrees of freedom of the FC 101 or by constraining one or more degrees of freedom of the FC 101. The platen can also include a gasket around the perimeter of the platen to provide additional retaining force by ensuring a vacuum seal between the FC 101 and the platen. The at least one platen 115 can also include a plurality of input ports 130*c* and a plurality of output ports 130*d*. The vacuum force generated by the vacuum ports 125 secures the FC 101 in place, and also creates contact force on the port gaskets to ensure a vacuum seal around the plurality of input ports 130*c* and plurality of output ports 130*d*. The plurality of input ports 130*c* can be configured to align with input apertures on the flow cell 110, and the plurality of output ports 130*d* can be configured to align with output apertures on the flow cell 110, such that material is able to flow into the plurality of input ports 130*c*, along the flow cell 110, and out of the flow cell 110 and the platen 115 via the plurality of output ports 130*d*. The plurality of input ports 130*c* and output ports 130*d* are aligned so as to not interfere with the optical imaging of the flow cell during sequencing. The labels "input" and "output" are interchangeable when the direction of flow is reversed. In embodiments, the at least one platen 115 can be configured to support reciprocating flow (i.e., wherein the plurality of input ports act as output ports). The input ports 130*c* and output ports 130*d* are in fluidic communication with a fluidic system. The fluid system may store fluids for washing or cleaning the fluidic network of the microfluidic device, and also for diluting the reactants. For example, the fluid system may include various reservoirs to store reagents, enzymes, other biomolecules, buffer solutions, aqueous, and non-polar solutions. Furthermore, the fluid system may also include waste reservoirs for receiving waste products. As used herein, fluids may be liquids, gels, gases, or a mixture of thereof. Also, a fluid can be a mixture of two or more fluids. The fluidic network may include a plurality of microfluidic components (e.g., fluid lines, pumps, flow cells or other fluidic devices, manifolds, reservoirs) configured to have one or more fluids flowing therethrough.

In embodiments, the gasket is a material or combination of materials. The gasket functions to create a seal between the members and maintain the seal for an extended period of time. The gasket may be made from any suitable material, such as rubber, polytetraflouroethylene (PTFE), silicone, metal, cork, felt, neoprene, nitrile rubber, fiberglass, a plastic polymer (e.g., polychlorotrifluoroethylene), or a combination thereof. In embodiments, the gasket further includes a surface coating. Such surface coatings are used to reduce nonspecific binding of moieties in the various reagents to the surfaces. In some embodiments, the coatings intended to reduce nonspecific binding may include PEG (Polyethylene Glycol), BSA (Bovine Serum Albumin), PEI (Polyethylenimine), PSI (Polysuccinimide), DDM (n-dodecyl-b-D-maltocide), fluorinated coatings, Teflon coatings, silanization coatings, or other appropriate coating.

In mechanical systems there are six degrees of freedom, traditionally thought of as three translational degrees of freedom and three rotational degrees of freedom. The three translational degrees of freedom include moving forward and backward on the Y-axis, also referred to as "surge;" moving left and right on the X-axis, also referred to as "sway;" and moving up and down on the Z-axis, also referred to as "heave." The three rotational degrees of freedom include tilting side to side on the X-axis, also referred to as "roll;" tilting forward and backward on the Y-axis, also referred to as "pitch;" and turning left and right on the Z-axis, also referred to as "yaw." As mentioned, the disclosed systems are configured to provide restraint of one or more, and possibly all, of these six degrees of freedom.

FIG. 2A illustrates an embodiment of a flow cell receiver (FCR) 200. The FCR 200 can include a surface, such as flat surface 205, configured to serve as a support surface for one or more components. For example, the flat surface 205 can include at least one platen 215 on which a flow cell assembly (FC) 201 can sit or be otherwise supported. The FC 201 can include a handle 220, a frame 250, and a pocket 255 within the frame 250, configured to retain a flow cell 210. In embodiments, the handle 220 can be a raised (e.g., an ergonomic) handle. For example, the handle 220 may extend beyond and above the flat surface 205, such as to enable easy removal of the FC 201 from the FCR 200. That is, at least a portion of the handle 220 is offset, such as vertically-offset, from the flat surface 205 so that it can be grasped by a user without having the flat surface impeding access to the handle 220. The handle can have any of a variety of shapes including an ergonomic shape that facilitates handling by a user. In embodiments, the flow cell frame 250 is configured to removably engage with a FCR 200 within a nucleic acid sequencing device. The term "removably engage" describe a relationship between the flow cell frame 250 and a receiving unit of a bioanalytical device, or interface of a bioanalytical device (e.g., platen 205 of a nucleic acid sequencing system), and is intended to mean that a connection between the flow cell carrier and the receiving unit of a bioanalytical device is readily separable without destroying the receiving unit of a bioanalytical device.

As discussed, the pocket 255 can be configured to retain the flow cell 210 by constraining all six degrees of freedom (or a subset thereof) of the flow cell 210. Furthermore, the FC 201 can be held in a proper location and orientation on the at least one platen 215 by a plurality of magnets, 240*a*-240*f*. The at least one platen 215 can also include a plurality of vacuum ports 225 configured to generate force, via vacuum pressure, sufficient to hold the FC 201 in the proper location and orientation on the at least one platen 215. For example, the vacuum pressure may be sufficient to ensure maximum physical contact between the flow cell 210 and the at least one platen 215. In embodiments, the vacuum pressure is considered sufficient when the vacuum pressure prevents movement of the flow cell 210 and the FC 201 when the FCR 200 is in motion. In embodiments, the FCR 200 is capable of adjusting position to orients the flow cell such that a maximal surface area of the flow cell is available to be exposed to an optical lens. For example, a flow cell may be mounted on the FCR that can translate in three dimensions, and may be oriented either in a horizontal or vertical position, with the microscope optics, light sources, and/or imaging devices being positioned appropriately relative to the FCR.

In embodiments, the vacuum pressure is less than 760 torr. In embodiments, the vacuum pressure is between 760 and 500 torr. In embodiments, the vacuum pressure is less than 500 torr. In embodiments, the FC 201 is held in the proper location and orientation by constraining all six degrees of freedom of the FC 201. The at least one platen 215 can also include a plurality of input ports 230 *a* and 230 *c* and a plurality of output ports 230 *b* and 230 *d*. The plurality of input ports 230 *a* and 230 *c* can be configured to align with input apertures on the flow cell 210, and the plurality of output ports 230 *b* and 230 *d* can be configured to align with output apertures on the flow cell 210. For example, the plurality of input ports 230 *a* and 230 *c* and the plurality of output ports 230 *b* and 230 *d* can be aligned with the flow cell 210 such that a material, such as a sequencing solution (e.g., a solution that includes a polymerase, nucleotides, or a buffer), is able to flow into the plurality of input ports 230 *a* and 230 *c* and into the flow cell 210, travel along at least one channel of the flow cell 210, and flow out of the flow cell 210 and the platen 215 via the plurality of output ports 230 *b* and 230 *d*, thereby facilitating unimpeded function of the flow cell 210. Note, the labels "input" and "output" are interchangeable when the direction of flow is reversed.

In embodiments, the FCR 200 can include a plurality of magnets 240*a*-240*h* configured to constrain all six degrees of freedom, as depicted in FIG. 2A. For example, two magnets 240*a* and 240*c* can be positioned along the long axis of the FC 201 (long side, which may serve to constrain sway and yaw). A third magnet 240*d* can aid with positioning of the FC 201 within the FCR 200 and can be positioned along the short axis of the FC 201 (short side, which may serve to constrain surge). The plane of the FC 201 will align to at least one platen 215 and can be retained vertically by a fourth magnet, 240*h* (shown in FIG. 2B; which may serve to constrain heave, roll, and pitch). The first three magnets 240*a*, 240*c*, and 240*d* can be offset in the vertical orientation relative to at least one metal pin (not shown in FIG. 2A) located in the frame 250 of the FC 201, such as to impart a slight downward force to positively locate the FC 201 onto the platen 215. It should be appreciated that the quantity and positioning of the magnets (or other constraining component) can vary to achieve any of a wide variety of constraint configurations. In embodiments, the FCR includes 2 to 20 magnets. In embodiments, the FCR includes less than 10 magnets. In embodiments, the FCR includes less than 5 magnets. In embodiments, the FCR includes 3 to 6 magnets. In embodiments, the FCR includes at least 3 magnets.

Figure 2B:
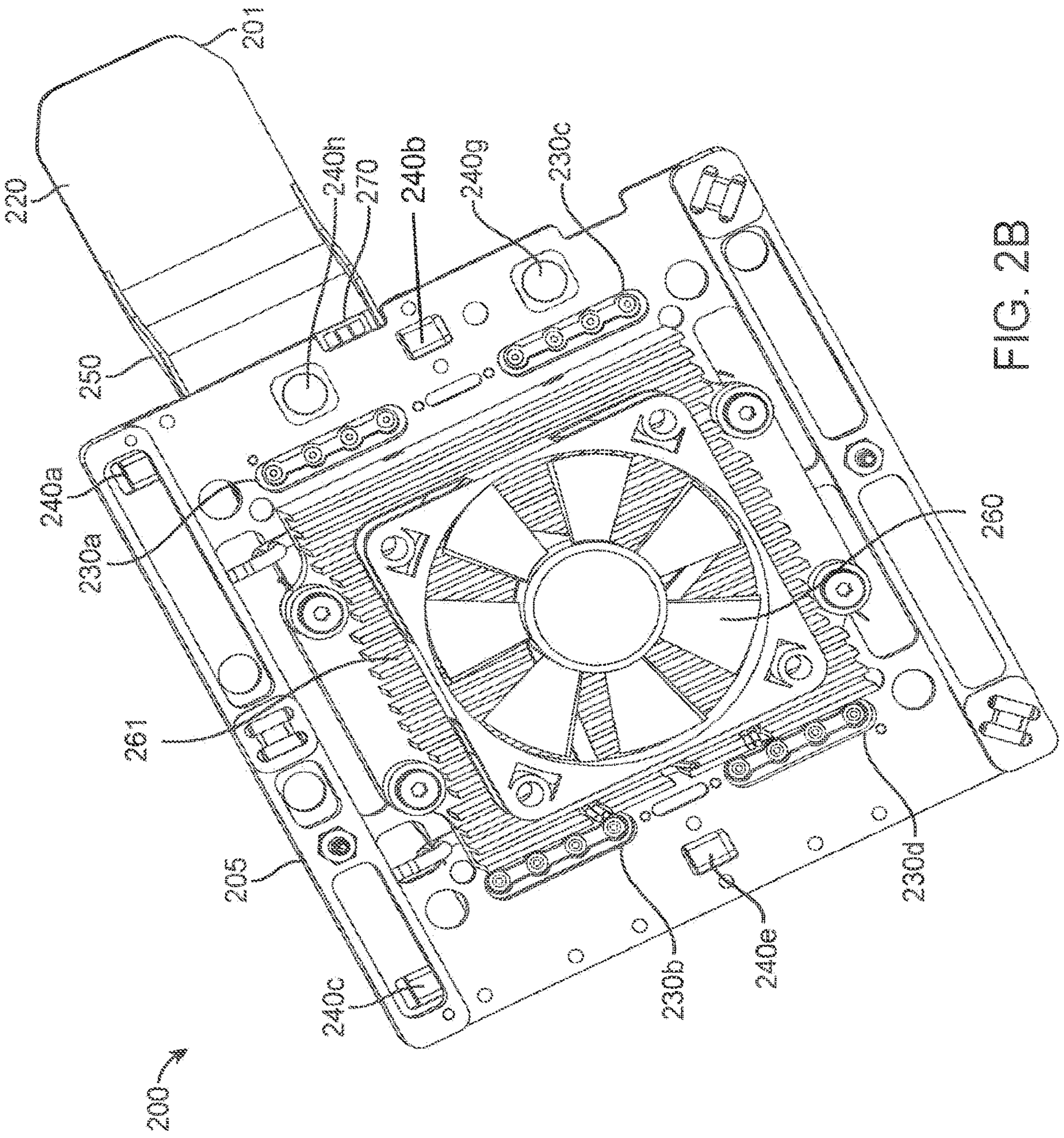
FIG. 2B is a bottom perspective view of the flow cell receiver of FIG. 2A.

FIG. 2B is a bottom perspective view of the FCR 200. As described above, the handle 220 of the FC 201 can extend above and beyond the flat surface 205 of the FCR 200. As shown in FIG. 2B, the FCR 200 can further include a temperature regulation apparatus, such as a fan 260, heating element, or passive cooling device. In embodiments, the FCR 200 can include a thermoelectric heating element (e.g., Peltier device) configured to heat and cool the platen 215, and a heat sink 261 configured to provide a thermal energy storage system that allows rapid heating and cooling of the platen 215. In embodiments, the heat sink 261 also includes a heating system configured to maintain the flow cell 210 at a desired temperature. The fan 260 can be used to regulate the temperature of the heat sink 261. For example, the fan 260 can remove excessive heat during cooling of the platen 215, which requires electrical energy input to the thermoelectric Peltier device to transfer heat energy out of the platen 215 and into the heat sink 261. In embodiments, the fan 260 is not in direct contact with the heat sink 261, and instead directs air to the heat sink 261 through a duct or plenum, thereby reducing the physical height.

Controlling the temperature may be carried out by a variety of means. For example, in embodiments, the temperature regulation apparatus is a thermoelectric temperature controller, e.g., a Peltier heater/cooler. Alternatively, the temperature regulation apparatus may incorporate a series of channels through which is flowed a recirculating temperature controlled fluid, e.g., water, ethylene glycol or oil, which is heated or cooled to a desired temperature, e.g., in an attached water bath. By way of example, some sequencing by synthesis methods include various cycles of extension, ligation, cleavage, and/or hybridization in which it may be desired to cycle the temperature. Further, in some sequencing techniques, temperatures may range from about 0° C. to about 20° C., to a higher temperature ranging from about 50° C. to about 95° C. for denaturation and/or other reaction stages.

Figure 2C:
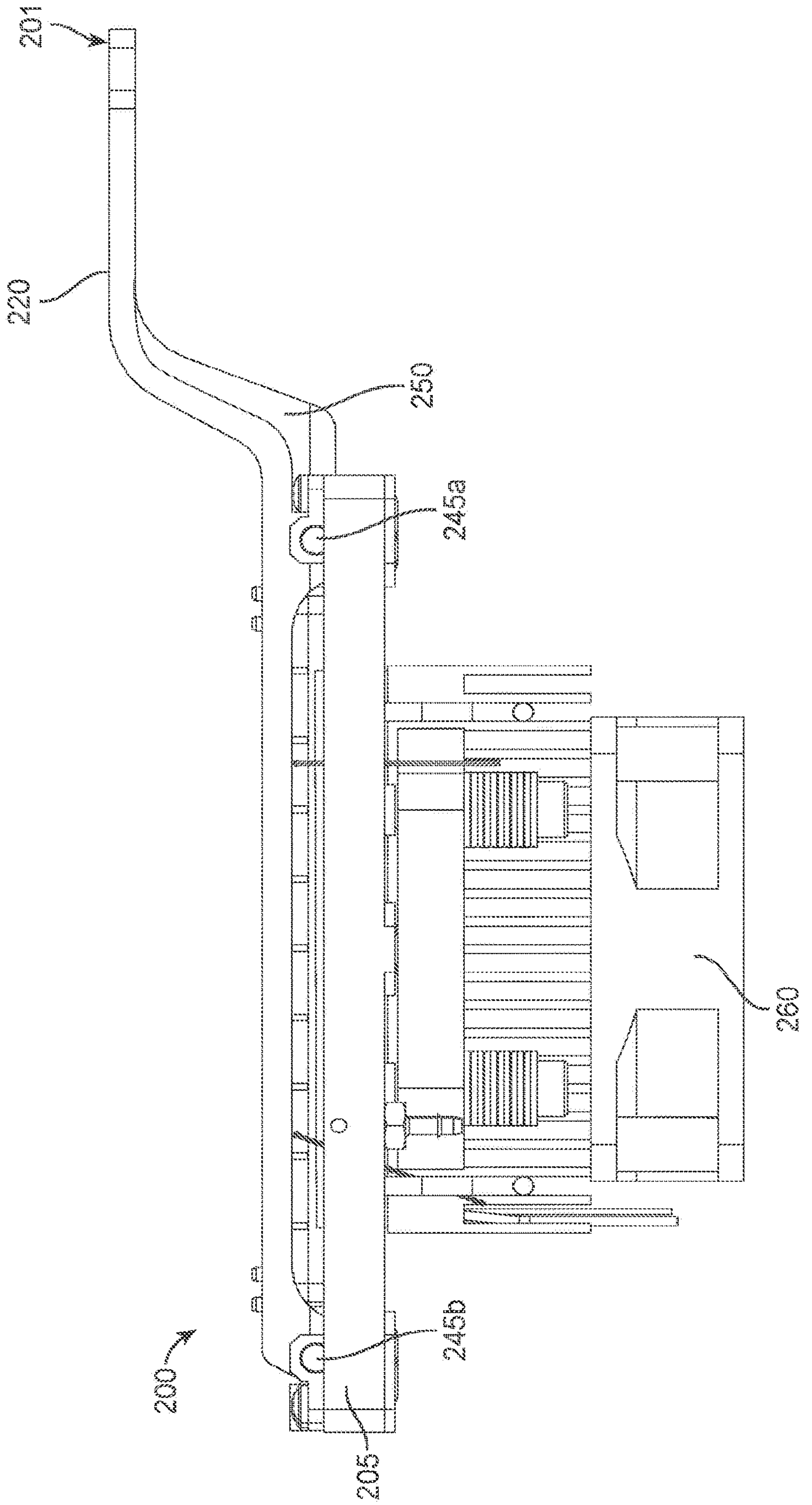
FIG. 2C is a side plan view of the flow cell receiver of FIG. 2A.

FIG. 2C is a side plan view of the FCR 200 including the fan 260 and the FC 201. The frame 250 of the FC 201 can be held in place on the FCR 200 in part by at least one metal pin, such as a proximal steel pin 245*a* and a distal steel pin 245*b*, as shown in FIG. 2C. In some embodiments, the frame 250 of the FC 201 can be held in place magnetically on the FCR 200 in part by at least one metal pin, such as a proximal steel pin 245*a* and a distal steel pin 245*b*.

Figure 2D:
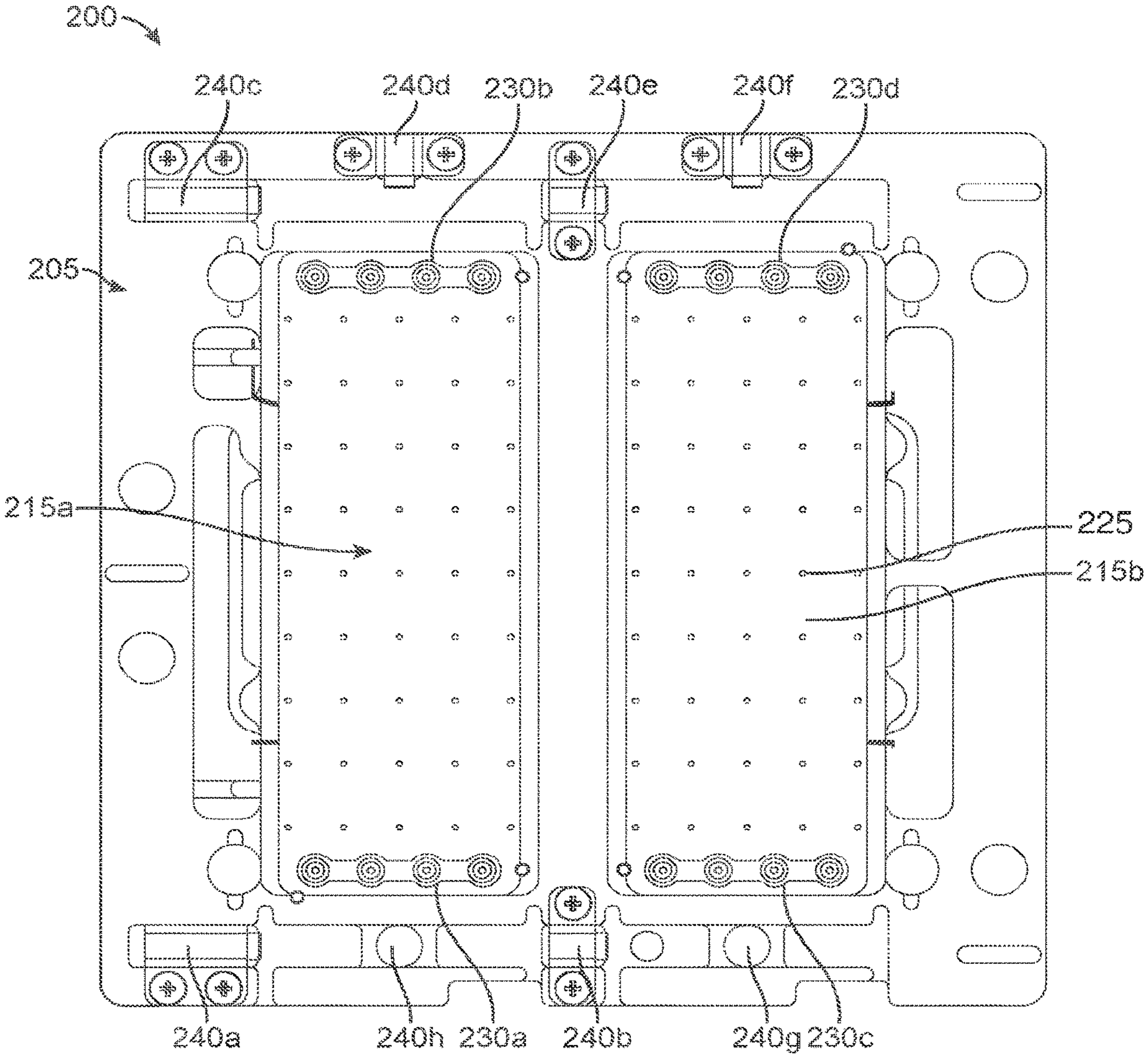
FIG. 2D is a top plan view of the flow cell receiver of FIG. 2A.

FIG. 2D is a top plan view of the FCR 200 depicting at least one platen 215*a* and 215*b*, a plurality of vacuum ports 225, and the location of the magnets 240*a*-240*h*. The at least one platen 215*a* and/or 215*b* can be configured to receive one or more flow cell(s) 210 within an accompanying FC 201 (wherein the FC 201 is not shown in FIG. 2D). In FIG. 2D, the FCR 200 is represented, and the plurality of vacuum ports 225, alternatively referred to as a vacuum port array, are visible. In some embodiments, the at least one platen 215*a* and/or 215*b* containing the plurality of vacuum ports 225 can be coated with a light absorbing material, such as to reduce light reflection which may affect imaging and/or reaction conditions in the flow cell 210. For example, the light absorbing coating can be an anti-reflective coating, a visible light absorbing coating, an ultraviolet light absorbing coating, an infrared light absorbing coating, a combination of any of the foregoing, or the like. In embodiments, the light absorbing coating includes inorganic oxide materials, titanium nitride, niobium nitride, polymers (e.g., polycarbonates, polystyrenes, and polyolefins), coal, or carbon nanotubes. In embodiments, the light absorbing coating includes zinc oxide (ZnO), titanium oxide ($TiO_X$), tin oxide ($SnO_X$), indium oxide ($InO_X$), copper oxide ($Cu_2O$), zinc sulfide (ZnS), cadmium sulfide (CdS), lead sulfides (PbS), iron pyrite ($FeS_2$), cadmium selenide (CdSe), lead selenide (PbSe), cadmium telluride (CdTe), lead telluride (PbTe), silicon (Si), germanium (Ge), gallium nitride (GaN), gallium arsenide (GaAs), indium arsenide (InAs), indium antimonide (InSb), $Pb_{1-x}Sn_xTe$, $Hg_{1-x}Cd_xTe$, InAsSb, InTlSb, InAs/GaInSb, HgTe/CdTe, $TiO_x$:phthalocyanine derivatives, naphthalocyanine derivatives, porphyrin derivatives, perylene derivatives, coumarin derivatives, rhodamine derivatives, eosin derivatives, erythrosine derivatives, acenes and polyacenes derivatives, oligothiophenes derivatives, benzothiophene (BT) derivatives, benzothiadiazole derivatives, benzodithiophene (BDT), fullerene derivative, C60, carbon nanotube, graphene, perylene derivative, polythiophene (PT) derivatives, polycarbazole, derivatives of polycarbazole, poly(p-phenylene vinylene) (PPV), derivatives of PPV, polyfluorene (PF), derivatives of PF, cyclopentadithiophene based polymers, or orbenzodithiophene (BDT) based polymers.

In embodiments, the one or more vacuum ports are positioned so they do not interfere with imaging the flow cell. For example, the one or more vacuum ports are positioned in areas which are not exposed to the optical lens during imaging. In embodiments, the vacuum ports are positioned (e.g., are substantially aligned) to be between the channels of the flow cell when a FC 101 is engaged.

In some embodiments, the at least one platen 215*a* and/or 215*b* may be made of a material that has a relatively high thermal conductivity. In embodiments, the platen may be stainless steel or aluminum. Other suitable materials for the platen include, but are not limited to, for example, silver, gold, copper, and/or various alloys and/or other metals.

Regarding the orientation of the plurality of magnets 204*a*-240*h*, the plurality of magnets 240*a*-240*h* can be installed such that the polarities are oriented to complete the magnetic field loop with constructive interference. For example, the side magnets (referred to as magnet 240*a* and magnet 240*c* in FIG. 2D) can be installed with the north pole facing toward the FC 201 while the front and rear magnets (referred to as magnets 240*d* and 240*h*, respectively, in FIG. 2D) can be installed with the north pole facing away from the FC 201. In embodiments, magnets 240*a*, 240*h*, 240*c*, and 240*d* can retain a flow cell carrier 201 on platen 215*a*, and magnets 240*b*, 240*g*, 240*e*, and 240*f* can retain a flow cell carrier 201 on platen 215*b*, as depicted in FIG. 2D. Thus, the magnets of the FCR create a magnetic field exerting a downward force on the FC 201, aiding in retaining the FC on the platen 215*a*. Magnets, as used herein, includes ferromagnetic, paramagnetic, and superparamagnetic materials. Note that a magnetic entity need not be formed entirely of a magnetic material but may instead comprise both magnetic and nonmagnetic materials. Typically a magnet will contain a magnetic or magnetizable material such as iron, cobalt, nickel, or certain ceramics.

Figure 3:
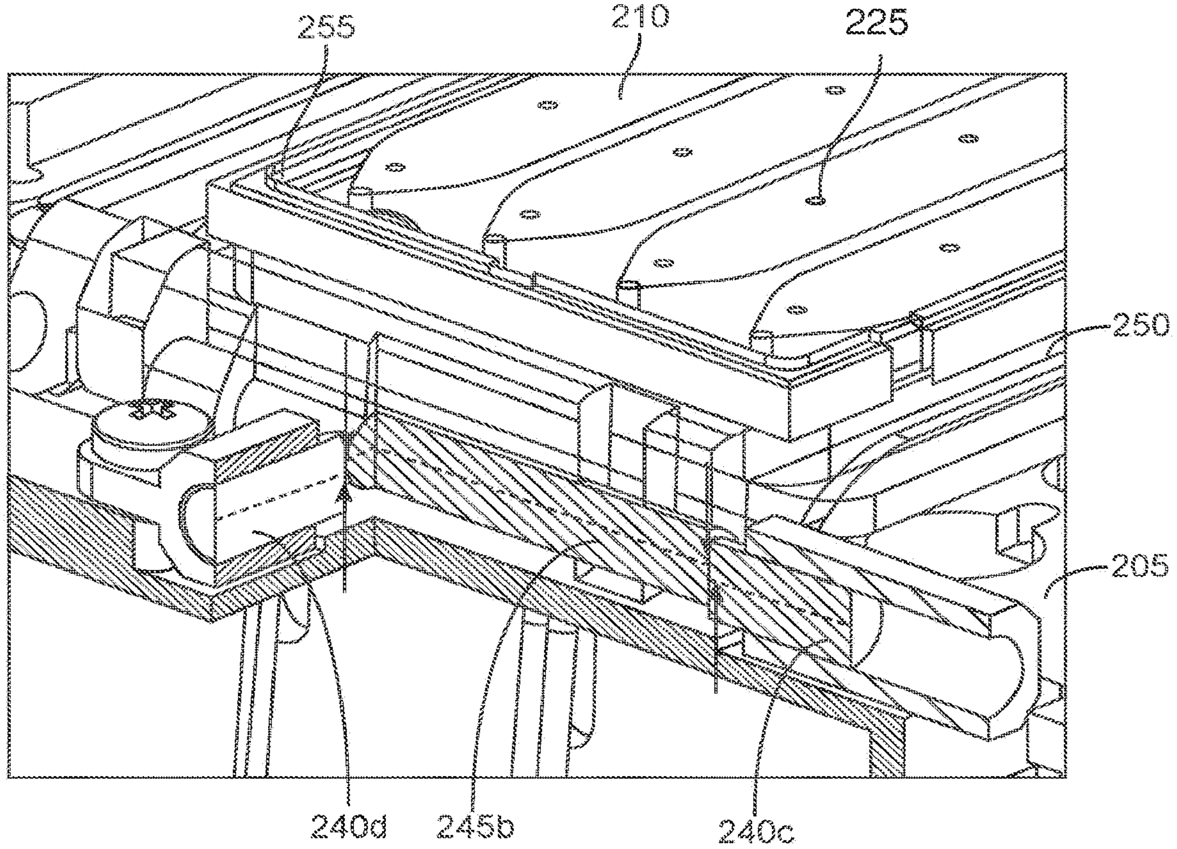
FIG. 3 is a cross-sectional enlarged view of a securing mechanism of the flow cell receiver of FIG. 2A.

FIG. 3 shows a cutaway view of magnet 240*d* and magnet 240*c* (or alternatively magnet 240*e* and magnet 2400 showing the vertical offset, which imparts a downward bias, further enhancing contact of the FC 201 with the FCR 200. To further aid in securing and retaining the FC 201, the FCR 200 can use a plurality of vacuum ports 225 to create a downward holding force, such as to lock the FC 201 to the platen 215*a*. For example, the plurality of vacuum ports 225 can provide a negative pressure that, when the FCR 200 is mounted in a bioanalytical device (e.g., a sequencing or cytometry device), draws the FC 201 into closer engagement with the surface of the at least one platen 215*a* and/or 215*b*, of the FCR 200. The resulting force can aid in holding the FC 201 in place, in providing intimate thermal contact, and in maintaining a flatter or more planar surface of the flow cell 210 for processing and imaging. Magnetic force and vacuum force can prevent or inhibit movement, even during high FCR 200 acceleration, for example, such as during movement to position the region of interest on flow cell 210 under a detection apparatus, such as a camera lens. The vacuum pressure in the plurality of vacuum ports 225 can evacuate the air under the entire FC 201, thus creating a down-force according to the formula $[(P_{atm}-P_{vac})\times\text{area}]$, or ((atmospheric pressure−vacuum pressure)×area), where pressure values are absolute values.

Figure 4A:
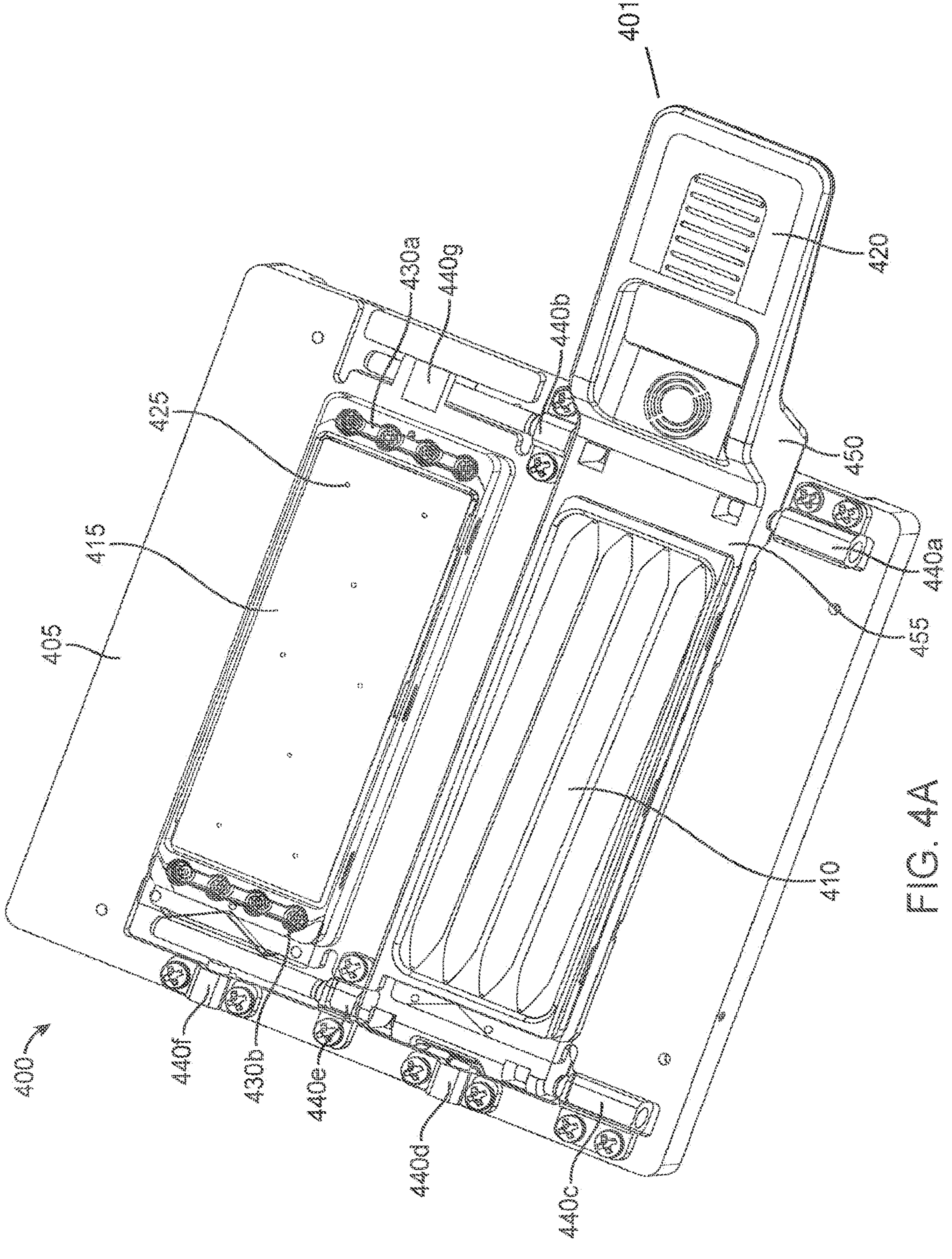
FIG. 4A is a top perspective view of another embodiment of a flow cell receiver consistent with implementations of the current subject matter.

FIG. 4A illustrates another embodiment of a flow cell receiver (FCR) 400. The FCR 400 can include a surface, such as flat surface 405, configured to serve as a support surface for one or more components. For example, the flat surface 405 can include at least one platen 415 on which a flow cell assembly (FC) 401 can sit or be otherwise supported. The FC 401 can include a handle 420, a frame 450, and a pocket 455 within the frame 450, configured to retain a flow cell 410. In embodiments, the handle 420 can be a raised (e.g., an ergonomic) handle. For example, the handle 420 may extend beyond and above the flat surface 405, such as to enable easy grasping by a user and removal of the FC 401 from the FCR 400. That is, at least a portion of the handle 420 is offset, such as vertically-offset, from the flat surface 405 so that it can be grasped by a user without having the flat surface impeding access to the handle 420. The handle can have any of a variety of shapes including an ergonomic shape that facilitates handling by a user.

As discussed, the pocket 455 can be configured to retain the flow cell 410 by constraining all six degrees of freedom (or a subset thereof) of the flow cell 410. For example, the FC 401 can be held in a proper location and orientation on the at least one platen 415 by one or more (e.g., a plurality) of magnets, 440 *a*-440 *f*. The at least one platen 415 can also include one or more (e.g., a plurality) of vacuum ports 425 configured to generate force, via vacuum pressure, sufficient to hold the FC 401 in the proper location and orientation on the at least one platen 415. For example, the vacuum pressure may be sufficient to ensure or increase likelihood of maximum physical contact between the flow cell 410 and the at least one platen 415. In embodiments, the vacuum pressure is considered sufficient when the vacuum pressure prevents movement of the flow cell 410 and the FC 401 when the FCR 400 is in motion. In embodiments, the vacuum pressure is less than 760 torr. In embodiments, the vacuum pressure is between 760 and 500 torr. In embodiments, the vacuum pressure is less than 500 torr. In embodiments, the FC 401 is held in the proper location and orientation by constraining all six degrees of freedom of the FC 401. The at least one platen 415 can also include a plurality of input ports 430 *a* and 430 *c* and a plurality of output ports 430 *b* and 430*d*. The vacuum force generated by the plurality of vacuum ports 425 not only secures the FC 401 in place, but it also creates the contact force on the port gaskets to ensure a vacuum seal around the plurality of input ports 430 *a* and 430 *c* and plurality of output ports 430 *b* and 430*d*. The plurality of input ports 430 *a* and 430 *c* can be configured to align with input apertures on the flow cell 410, and the plurality of output ports 430 *b* and 430*d* can be configured to align with output apertures on the flow cell 410. For example, the plurality of input ports 430 *a* and 430 *c* and the plurality of output ports 430 *b* and 430*d* can be aligned with the flow cell 410 such that a material, such as a sequencing solution (e.g., a solution that includes a polymerase, nucleotides, or a buffer), is able to flow into the plurality of input ports 430 *a* and 430 *c* and into the flow cell 410, travel along at least one channel of the flow cell 410, and flow out of the flow cell 410 and the platen 415 via the plurality of output ports 430 *b* and 430*d*, thereby facilitating unimpeded function of the flow cell 410. The plurality of input ports 430 *a* and 430 *c* and output ports 430 *b* and 430*d* are aligned so as to not interfere with the optical imaging of the flow cell during sequencing. The labels "input" and "output" are interchangeable when the direction of flow is reversed. In embodiments, the at least one platen 415 can be configured to support reciprocating flow (i.e., wherein the plurality of input ports act as output ports). In embodiments, each input and output port includes an elastomeric seal (e.g., O-ring) to form a seal with any fluidic ports. Elastomeric seals, such as O-ring seals, seal the interface of the two sets of ports so that fluids may flow between the flow cell and flow cell receiver without leaking.

In embodiments, the FCR 400 can include a plurality of magnets 440*a*-440*h* configured to constrain all six degrees of freedom, as depicted in FIG. 4A. For example, two magnets 440*a* and 440*c* can be positioned along the long axis of the FC 401 (long side which may constrain sway and yaw). A third magnet 440*d* can aid with positioning of the FC 401 within the FCR 400 and can be positioned along the short axis of the FC 401 (short side, which may constrain surge). The plane of the FC 401 will align to at least one platen 415 and can be retained vertically by a fourth magnet, 440*h* (shown in FIG. 4B; which may constrain heave, roll, and pitch). The first three magnets 440*a*, 440*c*, and 440*d* can be offset in the vertical orientation relative to at least one metal pin (not shown in FIG. 4A) located in the frame 450 of the FC 401, such as to impart a slight downward force to positively locate the FC 401 onto the platen 415. It should be appreciated that the quantity and positioning of the magnets (or other constraining component) can vary to achieve any of a wide variety of constraint configurations.

Figure 4B:
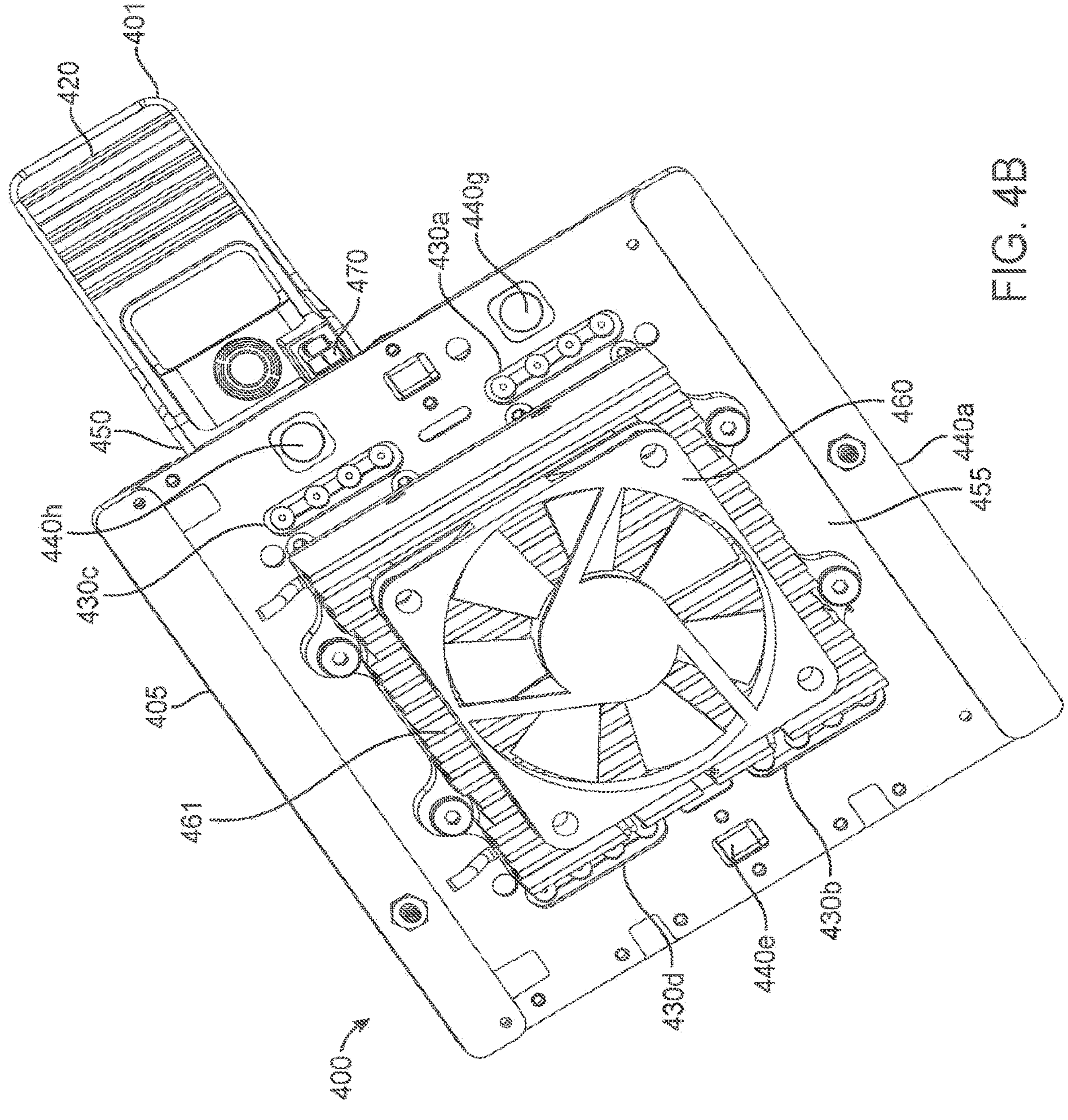
FIG. 4B is a bottom perspective view of the flow cell receiver of FIG. 4A.

FIG. 4B is a bottom perspective view of the FCR 400. As described above, the handle 420 of the FC 401 can extend above and beyond the flat surface 405 of the FCR 400. As shown in FIG. 4B, the FCR 400 can further include a temperature regulation apparatus, such as a fan 460. In embodiments, the FCR 400 can include a thermoelectric heating element (e.g., Peltier device) configured to heat and cool the platen 415, and a heat sink 461 configured to provide a thermal energy storage system that allows rapid heating and cooling of the platen 415. In embodiments, the heat sink 461 also includes a heating system configured to maintain the flow cell 410 at a desired temperature. The fan 460 can be used to regulate the temperature of the heat sink 461. For example, the fan 460 can remove excessive heat during cooling of the platen 415, which requires electrical energy input to the thermoelectric Peltier device to transfer heat energy out of the platen 415. The location of a fan proximate to the flow cell, may cause undesired vibrations, air currents, and/or other physical movements that may negatively impact image detection since the optics used for imaging in such devices may be relatively sensitive. In embodiments, the fan 460 is not in direct contact with the heat sink 461 and instead directs air to the heat sink 461 through a duct or plenum, thereby reducing the physical height of the imaging system above the FCR 400.

Figure 4C:
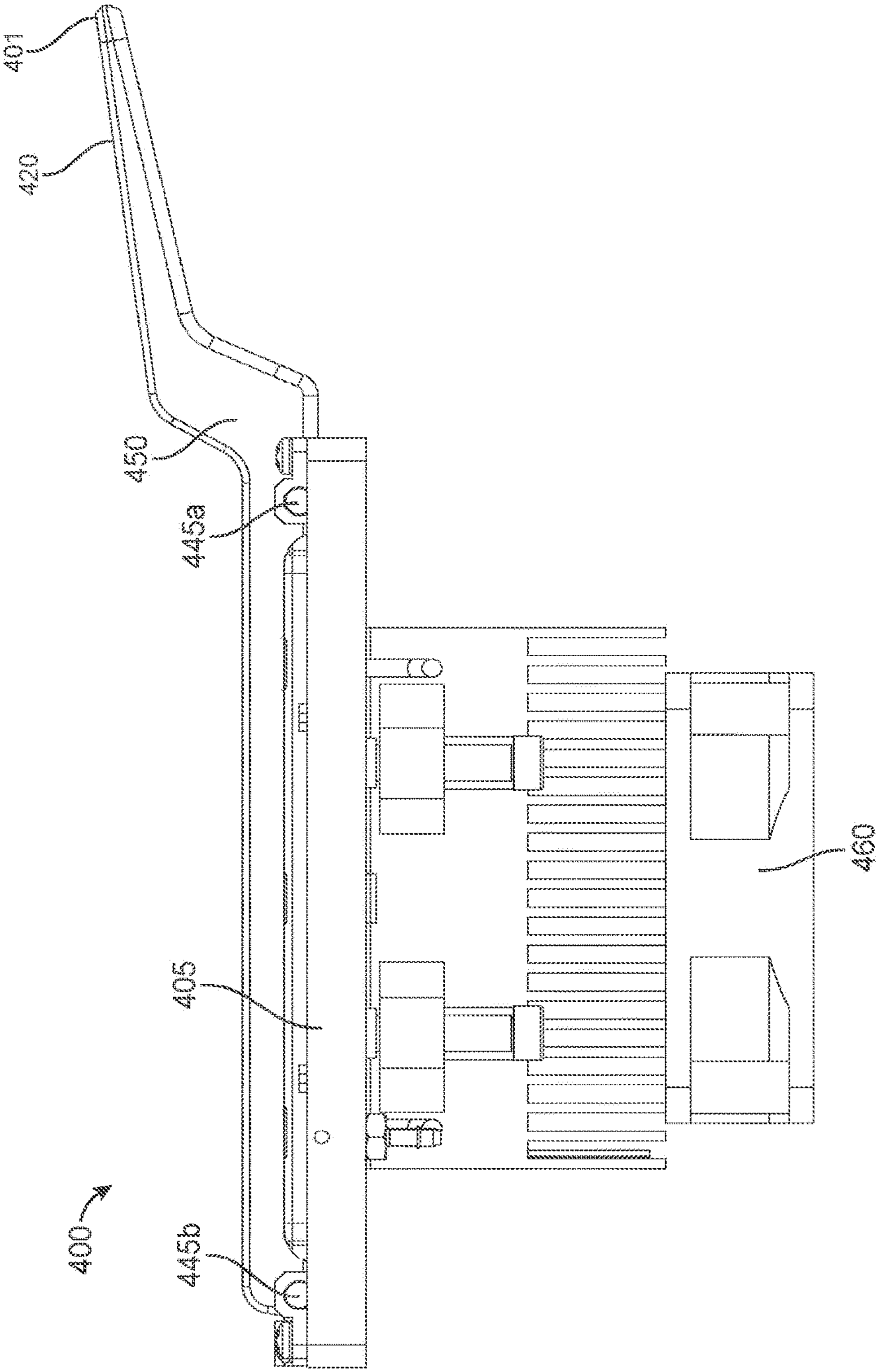
FIG. 4C is a side plan view of the flow cell receiver of FIG. 4A.

FIG. 4C is a side plan view of the FCR 400 including the fan 460 and the FC 401. The frame 450 of the FC 401 can be held in place on the FCR 400 in part by at least one metal pin, such as a proximal steel pin 445*a* and a distal steel pin 445*b*, as shown in FIG. 4C. In some embodiments, the frame 450 of the FC 401 can be held in place magnetically on the FCR 400 in part by at least one metal pin, such as a proximal steel pin 445*a* and a distal steel pin 445*b*.

Figure 4D:
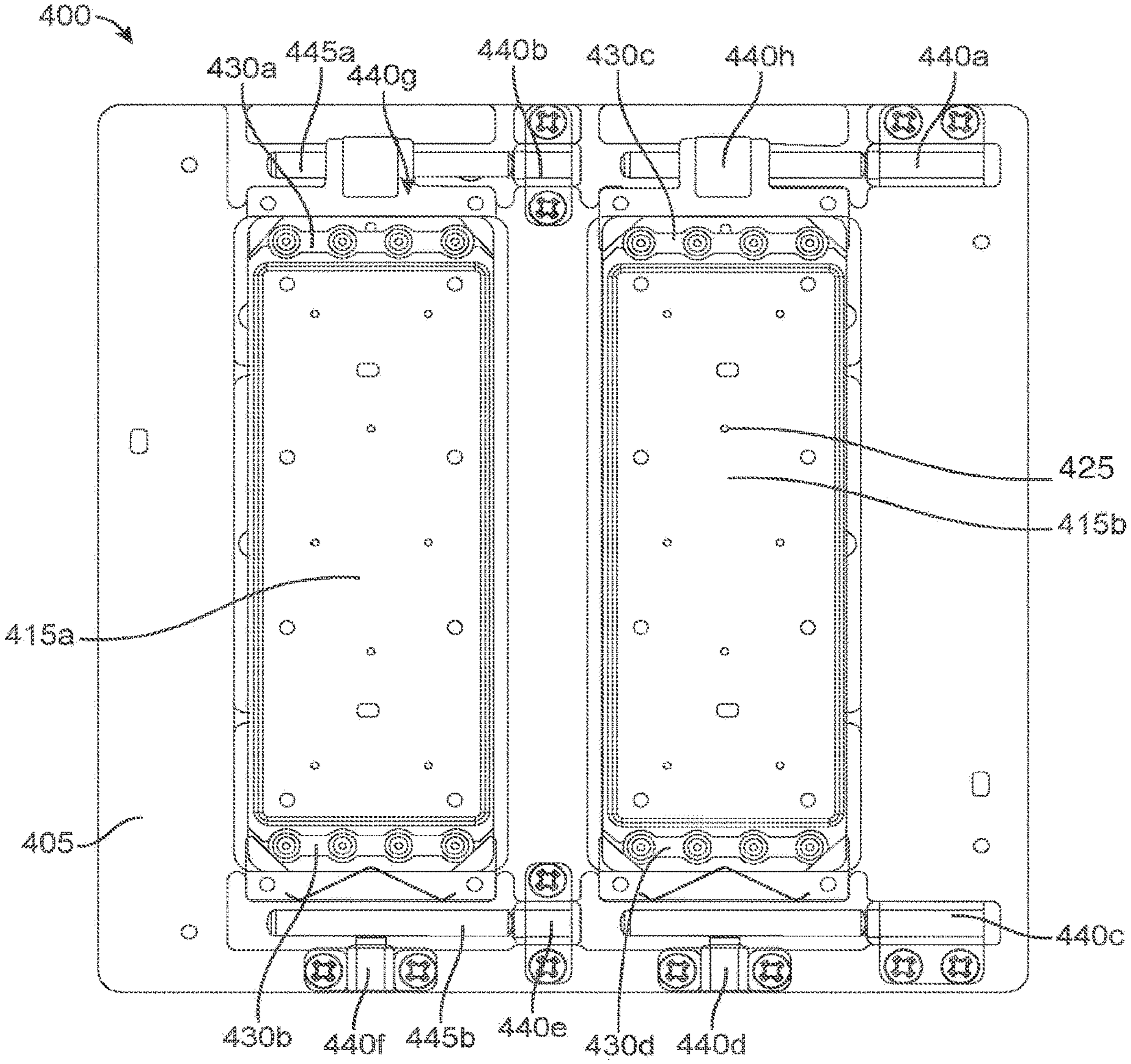
FIG. 4D is a top plan view of the flow cell receiver of FIG. 4A.

FIG. 4D is a top plan view of the FCR 400 depicting at least one platen 415*a* and/or 415*b*, one or more (e.g., a plurality) of vacuum ports 425, and the location of the magnets 440*a*-440*h*. The at least one platen 415*a* and/or 415*b* can be configured to receive one or more flow cell 410 within an accompanying FC 401 (wherein the FC 401 is not shown in FIG. 4D). In FIG. 4D, the FCR 400 is represented, and the plurality of vacuum ports 425, alternatively referred to as a vacuum port array, are visible. In some embodiments, the at least one platen 415*a* and/or 415*b* containing the plurality of vacuum ports 425 can be coated with a light absorbing material, such as to reduce light reflection which may affect imaging and/or reaction conditions in the flow cell 410. For example, the light absorbing coating can be an anti-reflective coating, a visible light absorbing coating, an ultraviolet light absorbing coating, an infrared light absorbing coating, a combination of any of the foregoing, or the like.

Regarding the orientation of the plurality of magnets 440*a*-440*h*, the plurality of magnets 440*a*-440*h* can be installed such that the polarities are oriented to complete a magnetic field loop with constructive interference. For example, the side magnets (referred to as magnet 440*a* and magnet 440*c* in FIG. 4D) can be installed with the north pole facing toward the FC 401 while the front and rear magnets (referred to as magnets 440*d* and 440*h*, respectively, in FIG. 4D) can be installed with the north pole facing away from the FC 401. In embodiments, magnets 440*a*, 440*h*, 440*c*, and

440_d_ can retain a FC 401 on platen 415_b_, and magnets 440_b_, 440_g_, 440_e_, and 440_f_ can retain a FC 401 on platen 415_a_, as depicted in FIG. 4D.

In an aspect is provided a method of securing a flow cell carrier in the flow cell receiver. In embodiments, the method includes placing the flow cell carrier on the at least one platen, aligning the flow cell carrier with the plurality of magnets, and engaging the one or more vacuum ports, wherein the securing is configured to constrain six degrees of freedom of the flow cell carrier.

In embodiments, the securing does not require any additional fixation mechanism (e.g., clamps, clips, screws, latches, knobs, buttons, or grooves), beyond the magnet and vacuum ports described herein. In embodiments, the one or more vacuum ports are configured to provide sufficient vacuum pressure to ensure maximum physical contact between the flow cell and the at least one platen. In embodiments, the plurality of magnets are oriented to complete a magnetic field loop with constructive interference. In embodiments, the one or more vacuum ports and the plurality of magnets prevent movement of the flow cell and the flow cell carrier. In embodiments, the one or more vacuum ports and the plurality of magnets prevent movement of the flow cell and the flow cell carrier when the flow cell receiver is in motion.

In embodiments, the at least one platen further includes a light absorbing coating. In embodiments, the at least one platen further comprises an anti-reflective coating. In embodiments, the at least one platen further includes a gasket. In embodiments, the gasket ensures sufficient vacuum pressure to secure the flow cell to the flow cell receiver and to ensure maximum physical contact between the flow cell and the at least one platen. In embodiments, the flow cell carrier is secured in the flow cell receiver such that a maximal surface area of the flow cell is available to be exposed to an optical lens.

In embodiments, the flow cell carrier includes a microchip, and further wherein the flow cell carrier is secured in the flow cell receiver such that the microchip is readable by electrical contact pins on a circuit board mounted in the flow cell receiver. In embodiments, the microchip is an electronically erasable programmable read only memory (EEPROM) chip.

In embodiments, the FCR includes circuit board. In embodiments, the FCR includes a circuit board configured to contact an EEPROM microchip. In embodiments, the FCR includes a circuit for storing and processing information, and/or modulating and demodulating a radio-frequency (RF) signal. In embodiments, the FCR includes an antenna for receiving and transmitting an RFID signal (e.g., an RFID signal from the flow cell receiver).

In an aspect is provided a method of sequencing a nucleic acid. In embodiments, the method includes securing a flow cell carrier in the flow cell receiver. In embodiments, the method includes placing the flow cell carrier on the at least one platen, aligning the flow cell carrier with the plurality of magnets, and engaging the one or more vacuum ports, wherein the securing is configured to constrain six degrees of freedom of the flow cell carrier. In embodiments, the method includes positioning a flow cell on a flow cell receiver. In embodiments, the method includes flowing the reagents necessary to sequence the nucleic acid. In embodiments, sequencing includes flowing at least one reagent component to the flow cell. The reagent may react with the nucleic acid to provide optically detectable signals that are indicative of an event-of-interest (or desired reaction). For example, the reagent may be fluorescently-labeled nucleotides used during SBS analysis. When excitation light is incident upon the sample having fluorescently-labeled nucleotides incorporated therein, the nucleotides may emit optical signals that are indicative of the type of nucleotide (A, T, C, or G), and the imaging system or detection apparatus may detect the optical signals.

In an aspect is provided a microfluidic device, wherein the microfluidic device includes a flow cell receiver. In embodiments, the microfluidic device includes an imaging system or detection apparatus. Any of a variety of detection apparatus can be configured to detect the reaction vessel or solid support where reagents interact. Examples include luminescence detectors, surface plasmon resonance detectors and others known in the art. Exemplary systems having fluidic and detection components that can be readily modified for use in a system herein include, but are not limited to, those set forth in U.S. Pat. Nos. 8,241,573, 8,039,817; or US Pat. App. Pub. No. 2012/0270305 A1, each of which is incorporated herein by reference. In embodiments, the microfluidic device further includes one or more excitation lasers.

In embodiments, the microfluidic device is a nucleic acid sequencing device. Nucleic acid sequencing devices utilize excitation beams to excite labeled nucleotides in the DNA containing sample to enable analysis of the base pairs present within the DNA. Many of the next-generation sequencing (NGS) technologies use a form of sequencing by synthesis (SBS), wherein modified nucleotides are used along with an enzyme to read the sequence of DNA templates in a controlled manner. In embodiments, sequencing includes a sequencing by synthesis event, where individual nucleotides are identified iteratively (e.g., incorporated and detected into a growing complementary strand), as they are polymerized to form a growing complementary strand. In embodiments, nucleotides added to a growing complementary strand include both a label and a reversible chain terminator that prevents further extension, such that the nucleotide may be identified by the label before removing the terminator to add and identify a further nucleotide. Such reversible chain terminators include removable 3' blocking groups, for example as described in U.S. Pat. Nos. 10,738,072, 7,541,444 and 7,057,026. Once such a modified nucleotide has been incorporated into the growing polynucleotide chain complementary to the region of the template being sequenced, there is no free 3'-OH group available to direct further sequence extension and therefore the polymerase cannot add further nucleotides. Once the identity of the base incorporated into the growing chain has been determined, the 3' reversible terminator may be removed to allow addition of the next successive nucleotide. In embodiments, the nucleic acid sequencing device utilizes the detection of four different nucleotides that comprise four different labels.

I. Definitions

All patents, patent applications, articles and publications mentioned herein, both supra and infra, are hereby expressly incorporated herein by reference in their entireties.

Unless defined otherwise herein, all technical and scientific terms used herein have the same meaning as commonly understood by one of ordinary skill in the art to which this disclosure belongs. Various scientific dictionaries that include the terms included herein are well known and available to those in the art. Although any methods and materials similar or equivalent to those described herein find use in the practice or testing of the disclosure, some preferred methods and materials are described. Accordingly, the terms defined immediately below are more fully described by reference to the specification as a whole. It is to be understood that this disclosure is not limited to the particular methodology, protocols, and reagents described, as these may vary, depending upon the context in which they are used by those of skill in the art.

As used herein, the singular terms “a”, “an”, and “the” include the plural reference unless the context clearly indicates otherwise.

Reference throughout this specification to, for example, “one embodiment”, “an embodiment”, “another embodiment”, “a particular embodiment”, “a related embodiment”, “a certain embodiment”, “an additional embodiment”, or “a further embodiment” or combinations thereof means that a particular feature, structure or characteristic described in connection with the embodiment is included in at least one embodiment of the present disclosure. Thus, the appearances of the foregoing phrases in various places throughout this specification are not necessarily all referring to the same embodiment. Furthermore, the particular features, structures, or characteristics may be combined in any suitable manner in one or more embodiments.

As used herein, the term “about” means a range of values including the specified value, which a person of ordinary skill in the art would consider reasonably similar to the specified value. In embodiments, the term “about” means within a standard deviation using measurements generally acceptable in the art. In embodiments, about means a range extending to +/−10% of the specified value. In embodiments, about means the specified value.

Throughout this specification, unless the context requires otherwise, the words “comprise”, “comprises” and “comprising” will be understood to imply the inclusion of a stated step or element or group of steps or elements but not the exclusion of any other step or element or group of steps or elements. By “consisting of” is meant including, and limited to, whatever follows the phrase “consisting of.” Thus, the phrase “consisting of” indicates that the listed elements are required or mandatory, and that no other elements may be present. By “consisting essentially of” is meant including any elements listed after the phrase, and limited to other elements that do not interfere with or contribute to the activity or action specified in the disclosure for the listed elements. Thus, the phrase “consisting essentially of” indicates that the listed elements are required or mandatory, but that no other elements are optional and may or may not be present depending upon whether or not they affect the activity or action of the listed elements.

As used herein, the term “nucleic acid” refers to nucleotides (e.g., deoxyribonucleotides or ribonucleotides) and polymers thereof in either single-, double- or multiple-stranded form, or complements thereof. The terms “polynucleotide,” “oligonucleotide,” “oligo” or the like refer, in the usual and customary sense, to a sequence of nucleotides. The term “nucleotide” refers, in the usual and customary sense, to a single unit of a polynucleotide, i.e., a monomer. Nucleotides can be ribonucleotides, deoxyribonucleotides, or modified versions thereof. Examples of polynucleotides contemplated herein include single and double stranded DNA, single and double stranded RNA, and hybrid molecules having mixtures of single and double stranded DNA and RNA with linear or circular framework. Non-limiting examples of polynucleotides include a gene, a gene fragment, an exon, an intron, intergenic DNA (including, without limitation, heterochromatic DNA), messenger RNA (mRNA), transfer RNA, ribosomal RNA, a ribozyme, cDNA, a recombinant polynucleotide, a branched polynucleotide, a plasmid, a vector, isolated DNA of a sequence, isolated RNA of a sequence, a nucleic acid probe, and a primer. Polynucleotides useful in the methods of the disclosure may comprise natural nucleic acid sequences and variants thereof, artificial nucleic acid sequences, or a combination of such sequences.

A polynucleotide is typically composed of a specific sequence of four nucleotide bases: adenine (A); cytosine (C); guanine (G); and thymine (T) (uracil (U) for thymine (T) when the polynucleotide is RNA). Thus, the term “polynucleotide sequence” is the alphabetical representation of a polynucleotide molecule; alternatively, the term may be applied to the polynucleotide molecule itself. This alphabetical representation can be input into databases in a computer having a central processing unit and used for bioinformatics applications such as functional genomics and homology searching. Polynucleotides may optionally include one or more non-standard nucleotide(s), nucleotide analog(s) and/or modified nucleotides.

As used herein, the term “polynucleotide template” refers to any polynucleotide molecule that may be bound by a polymerase and utilized as a template for nucleic acid synthesis. As used herein, the term “polynucleotide primer” refers to any polynucleotide molecule that may hybridize to a polynucleotide template, be bound by a polymerase, and be extended in a template-directed process for nucleic acid synthesis, such as in a PCR or sequencing reaction. Polynucleotide primers attached to a core polymer within a core are referred to as “core polynucleotide primers.”

In general, the term “target polynucleotide” refers to a nucleic acid molecule or polynucleotide in a starting population of nucleic acid molecules having a target sequence whose presence, amount, and/or nucleotide sequence, or changes in one or more of these, are desired to be determined. In general, the term “target sequence” refers to a nucleic acid sequence on a single strand of nucleic acid. The target sequence may be a portion of a gene, a regulatory sequence, genomic DNA, cDNA, RNA including mRNA, miRNA, rRNA, or others. The target sequence may be a target sequence from a sample or a secondary target such as a product of an amplification reaction. A target polynucleotide is not necessarily any single molecule or sequence. For example, a target polynucleotide may be any one of a plurality of target polynucleotides in a reaction, or all polynucleotides in a given reaction, depending on the reaction conditions. For example, in a nucleic acid amplification reaction with random primers, all polynucleotides in a reaction may be amplified. As a further example, a collection of targets may be simultaneously assayed using polynucleotide primers directed to a plurality of targets in a single reaction. As yet another example, all or a subset of polynucleotides in a sample may be modified by the addition of a primer-binding sequence (such as by the ligation of adapters containing the primer binding sequence), rendering each modified polynucleotide a target polynucleotide in a reaction with the corresponding primer polynucleotide(s).

As used herein, the term “flow cell” refers to the reaction vessel in a nucleic acid sequencing device. The flow cell is typically a glass slide containing small fluidic channels (e.g., a glass slide 75 mm×25 mm×1 mm having one or more channels), through which sequencing solutions (e.g., polymerases, nucleotides, and buffers) may traverse. Though typically glass, suitable flow cell materials may include polymeric materials, plastics, silicon, quartz (fused silica), Borofloat® glass, silica, silica-based materials, carbon, metals, an optical fiber or optical fiber bundles, sapphire, or plastic materials such as COCs and epoxies. The particular material can be selected based on properties desired for a particular use. For example, materials that are transparent to a desired wavelength of radiation are useful for analytical techniques that will utilize radiation of the desired wavelength. Conversely, it may be desirable to select a material that does not pass radiation of a certain wavelength (e.g., being opaque, absorptive, or reflective). In embodiments, the material of the flow cell is selected due to the ability to conduct thermal energy. In embodiments, a flow cell includes inlet and outlet ports and a flow channel extending therebetween. The flow cell is not intended to be limited to any particular size, though typical flow cells are about 75 mm×25 mm. The depth (i.e., the thickness) of the flow cell depends on the particular use, for example the flow cell may be about 75 mm×25 mm×0.5-2.0 mm. In embodiments, the flow cell is capable of being removed from the flow cell carrier. In embodiments, the flow cell is permanently affixed to the flow cell carrier. Flow cells may have one or more fluidic channels in which a polynucleotide is displayed (e.g., wherein polynucleotides are directly attached to the flow cell or wherein the polynucleotides are attached to one or more beads arrayed upon or within a flow cell channel) and can be comprised of glass, silicon, plastic, or various combinations thereof. In embodiments, the flow cell can include different numbers of channels (e.g., 1 channel, 2 or more channels, 4 or more channels, or 6, 8, 10, 16 or more channels, etc.). Additionally, the flow cell can include channels of different depths and/or widths (different both between channels in different flowcells and different between channels within the same flowcell). For example, while the channels may be 50 μm deep, 100 μm deep, or 500 μm deep. Flow cells typically hold a sample (e.g., a plurality of nucleic acid clusters) along a surface for imaging by an external imaging system. Flow cells provide a convenient format for housing an array of nucleic acids that is subjected to a sequencing-by-synthesis (SBS) or other sequencing technique that involves repeated delivery of reagents in cycles. Examples of flowcells and related fluidic systems and detection platforms that can be readily used in the methods of the present disclosure are described, for example, in Bentley et al., Nature 456:53-59 (2008). Alternatively, in embodiments, the flow cell includes a plurality of open wells (e.g., wells of a multi-well plate, surface of a chip, or surface of a sheet).

In embodiments, the flow cell includes one or more channels each having at least one transparent window. In embodiments, the window can be transparent to radiation in a particular spectral range including, but not limited to x-ray, ultraviolet (UV), visible (VIS), infrared (IR), microwave and/or radio wave radiation. In embodiments, one or more windows can provide a view to an internal substrate to which polynucleotides are attached. Exemplary flow cells and physical features of flow cells that can be useful in a method or apparatus set forth herein are described, for example, in US 2010/0111768, US 2011/0059865 or US 2012/0270305, each of which is incorporated herein by reference in its entirety.

The flow cells used in the various embodiments can include millions of individual nucleic acid clusters, e.g., about 2-8 million clusters per channel. Each of such clusters can give read lengths of at least 25-100 bases for DNA sequencing. The systems and methods herein can generate over a gigabase (one billion bases) of sequence per run.

As used herein, the term "channel" refers to a passage in or on a substrate material that directs the flow of a fluid. A channel may run along the surface of a substrate, or may run through the substrate between openings in the substrate. A channel can have a cross section that is partially or fully surrounded by substrate material (e.g., a fluid impermeable substrate material). For example, a partially surrounded cross section can be a groove, trough, furrow or gutter that inhibits lateral flow of a fluid. The transverse cross section of an open channel can be, for example, U-shaped, V-shaped, curved, angular, polygonal, or hyperbolic. A channel can have a fully surrounded cross section such as a tunnel, tube, or pipe. A fully surrounded channel can have a rounded, circular, elliptical, square, rectangular, or polygonal cross section. In particular embodiments, a channel can be located in a flow cell, for example, being embedded within the flow cell. A channel in a flow cell can include one or more windows that are transparent to light in a particular region of the wavelength spectrum. In embodiments, the channel contains one or more polymers. In embodiments, the channel is filled by the one or more polymers, and flow through the channel (e.g., as in a sample fluid) is directed through the polymer in the channel. In embodiments, the channel contains a gel. The term "gel" in this context refers to a semi-rigid solid that is permeable to liquids and gases. Exemplary gels include, but are not limited to, those having a colloidal structure, such as agarose; polymer mesh structure, such as gelatin; or cross-linked polymer structure, such as polyacrylamide or a derivative thereof. Analytes, such as polynucleotides, can be attached to a gel or polymer material via covalent or non-covalent means. Exemplary methods and reactants for attaching nucleic acids to gels are described, for example, in US 2011/0059865 which is incorporated herein by reference. The analytes can be nucleic acids and the nucleic acids can be attached to the gel or polymer via their 3' oxygen, 5' oxygen, or at other locations along their length such as via a base moiety of the 3' terminal nucleotide, a base moiety of the 5' nucleotide, and/or one or more base moieties elsewhere in the molecule. In embodiments, the shape of the channel can include sides that are curved, linear, angled or a combination thereof. Other channel features can be linear, serpentine, rectangular, square, triangular, circular, oval, hyperbolic, or a combination thereof. The channels can have one or more branches or corners. The channels can connect two points on a substrate, one or both of which can be the edge of the substrate. The channels can be formed in the substrate material by any suitable method. For example, channels can be drilled, etched, or milled into the substrate material. Channels can be formed in the substrate material prior to bonding multiple layers together. Alternatively, or additionally, channels can be formed after bonding layers together.

As used herein, the term "substrate" refers to a solid support material. The substrate can be non-porous or porous. The substrate can be rigid or flexible. A nonporous substrate generally provides a seal against bulk flow of liquids or gases. Exemplary solid supports include, but are not limited to, glass and modified or functionalized glass, plastics (including acrylics, polystyrene and copolymers of styrene and other materials, polypropylene, polyethylene, polybutylene, polyurethanes, Teflon™, cyclic olefin copolymers, polyimides etc.), nylon, ceramics, resins, Zeonor, silica or silica-based materials including silicon and modified silicon, carbon, metals, inorganic glasses, optical fiber bundles, photopatternable dry film resists, UV-cured adhesives and polymers. Particularly useful solid supports for some embodiments have at least one surface located within a flow cell. The term "surface" is intended to mean an external part or external layer of a substrate. The surface can be in contact with another material such as a gas, liquid, gel, polymer, organic polymer, second surface of a similar or different material, metal, or coat. The surface, or regions thereof, can be substantially flat. The substrate and/or the surface can have surface features such as wells, pits, channels, ridges, raised regions, pegs, posts or the like. The term "well" refers to a discrete concave feature in a substrate having a surface opening that is completely surrounded by interstitial region(s) of the surface. Wells can have any of a variety of shapes at their opening in a surface including but not limited to round, elliptical, square, polygonal, or star shaped (i.e., star shaped with any number of vertices). The cross section of a well taken orthogonally with the surface may be curved, square, polygonal, hyperbolic, conical, or angular.

Where a range of values is provided, it is understood that each intervening value, to the tenth of the unit of the lower limit unless the context clearly indicates otherwise, between the upper and lower limit of that range, and any other stated or unstated intervening value in, or smaller range of values within, that stated range is encompassed within the invention. The upper and lower limits of any such smaller range (within a more broadly recited range) may independently be included in the smaller ranges, or as particular values themselves, and are also encompassed within the invention, subject to any specifically excluded limit in the stated range. Where the stated range includes one or both of the limits, ranges excluding either or both of those included limits are also included in the invention.

The term "platen" is used in accordance with its plain ordinary meaning and refers to a flat platform. The platform composition may include a substantially rigid material, for example, but not limited to, polymers, metals, inorganic oxide materials, such as glasses and sapphire-based materials, and ceramics. In embodiments, the platen includes a surface coating. Numerous surface coatings are possible, such as a polymer thin film, where the polymer may be selected from a range of physical and surface chemistry properties, such as, for example polyhalohydrocarbon, polystyrene, polyamide, polyimide and the like. Alternatively, a surface coating could be an inorganic coating, such as a silicon nitride, silicon carbide, silicon oxide, or diamond. In embodiments, a platen is a substantially planar platform.

As used herein, the terms "thermoelectric Peltier device" and "Peltier device" are used in accordance with their plain ordinary meaning and refers to an alternating p and n-type semiconductor solid state heat pump capable of transferring heat from one side of the device to the other with consumption of electrical energy. Depending on the direction of current, it can be used to heat or cool a surface.

As used herein, the term "raised handle" refers to the appendage 120 that is elevated relative to the bottom of the frame 150. For example, when the frame 150 is in contact with a work surface (e.g., a table surface), the raised handle may be about 15 mm to about 25 mm from the surface. In embodiments, the raised handle is about 1, 2, 3, 4, 5, 6, 7, 8, 9, or 10 cm from the surface (for example when measured from the uppermost point or edge of the handle). In embodiments, the raised handle is about 5, 6, 7, 8, 9, 10, 11, 12, 13, 14, or 15 cm from the surface (for example when measured from the uppermost point or edge of the handle). In embodiments, the frame 150 is about 22 mm from the surface. The raised handle is operatively attached to the flow cell carrier so the user can grasp the flow cell carrier. In embodiments, the raised handle 120 does not make contact with the surface (aside from the attached frame 150 contact with the surface). A raised handle may be considered an ergonomic handle.

As used herein, the term "ergonomic handle" refers to an appendage 120 that is designed to improve efficiency, comfort, or safety. For example, an ergonomic handle may be designed such that a user can align their fingers on the handle in a manner that maximizes hand capacity and does not require wrist flexion, extension, or deviation, in order to allow the user to maintain a neutral wrist posture. The ergonomic handle may include additional features such as ridges, or other textures such as grooves, indentations, rippling, stippling, or the like, to improve grip. Alternatively, the ergonomic handle may further include a polymer or rubber coating (e.g., synthetic polymer, thermoplastic, or plastisol coating). The polymer or rubber coating may provide a flexible, non-slip cushion to further promote the ergonomic design of the handle.

The term "injection molded" is used in accordance with its ordinary meaning in the art and refers to a manufacturing process for producing parts by injecting hot (e.g., molten) material into a mold. Injection molding may be performed with a variety of input materials, such as metals, glasses, elastomers, confections, and polymers (e.g., thermoplastic and thermosetting polymers).

As used herein, the terms "sequencing", "sequence determination", "determining a nucleotide sequence", and the like include determination of a partial or complete sequence information (e.g., a sequence) of a polynucleotide being sequenced, and particularly physical processes for generating such sequence information. That is, the term includes sequence comparisons, consensus sequence determination, contig assembly, fingerprinting, and like levels of information about a target polynucleotide, as well as the express identification and ordering of nucleotides in a target polynucleotide. The term also includes the determination of the identification, ordering, and locations of one, two, or three of the four types of nucleotides within a target polynucleotide. In some embodiments, a sequencing process described herein comprises contacting a template and an annealed primer with a suitable polymerase under conditions suitable for polymerase extension and/or sequencing. The sequencing methods are preferably carried out with the target polynucleotide arrayed on a solid substrate within a flow cell (i.e., within a channel of the flow cell). In an embodiment, the sequencing is sequencing by synthesis (SBS). Briefly, SBS methods involve contacting target nucleic acids with one or more labeled nucleotides (e.g., fluorescently labeled) in the presence of a DNA polymerase. Optionally, the labeled nucleotides can further include a reversible termination property that terminates extension once the nucleotide has been incorporated. Thus, for embodiments that use reversible termination, a cleaving solution can be delivered to the flow cell (before or after detection occurs). Washes can be carried out between the various delivery steps. The cycle can then be repeated n times to extend the primer by n nucleotides, thereby detecting a sequence of length n. Exemplary SBS procedures and detection platforms that can be readily adapted for use with the methods of the present disclosure are described, for example, in Bentley et al., Nature 456:53-59 (2008), WO 2004/018497; and WO 2007/123744, each of which is incorporated herein by reference in its entirety. In an embodiment, sequencing is pH-based DNA sequencing. The concept of pH-based DNA sequencing, has been described in the literature, including the following references that are incorporated by reference: US2009/0026082; and Pourmand et al, Proc. Natl. Acad. Sci., 103:6466-6470 (2006) which are incorporated herein by reference in their entirety. Other sequencing procedures that use cyclic reactions can be used, such as pyrosequencing. Sequencing-by-ligation reactions are also useful including, for example, those described in Shendure et al. Science 309:1728-1732 (2005).

The term "align" or "alignment" is used in accordance with its ordinary meaning and refers to perfect alignment and alignment with relatively small, insignificant amount of deviation/misalignment (e.g., <5%).

The terms "fluid communication" or "fluidically coupled" refers to two spatial regions being connected together such that a liquid or gas may flow between the two spatial regions.

The term "nucleic acid sequencing device" means an integrated system of one or more chambers, ports, and channels that are interconnected and in fluid communication and designed for carrying out an analytical reaction or process, either alone or in cooperation with an appliance or instrument that provides support functions, such as sample introduction, fluid and/or reagent driving means, temperature control, detection systems, data collection and/or integration systems, for the purpose of determining the nucleic acid sequence of a template polynucleotide. Nucleic acid sequencing devices may further include valves, pumps, and specialized functional coatings on interior walls. Nucleic acid sequencing devices may include a flow cell carrier, that orients the flow cell such that a maximal surface area of the flow cell is available to be exposed to an optical lens. An example flow cell carrier unit is described in U.S. Provisional Patent Application No. 62/952,787, entitled "FLOW CELL CARRIER AND METHODS OF USE", which is incorporated herein by reference in its entirety. Other nucleic acid sequencing devices include those provided by Illumina™, Inc. (e.g. HiSeg™, MiSeg™, NextSeq™, or NovaSeq™ systems), Life Technologies™ (e.g. ABI PRISM™, or SOLiD™ systems), Pacific Biosciences (e.g. systems using SMRT™ Technology such as the Sequel™ or RS II™ systems), or Qiagen (e.g. Genereader™ system).

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference in their entirety for all purposes.

What is claimed is:

1. A method of detecting a fluorescently labeled nucleotide in a sample using a receiving device comprising a platform, a vacuum port and a magnet, wherein the vacuum port and the magnet are configured to align, secure, and retain a solid support on the platform, said method comprising:

placing a solid support comprising a sample on the platform, wherein the sample comprises the fluorescently labeled nucleotide;

directing an excitation beam onto the sample; and detecting the fluorescently labeled nucleotide in the sample by detecting a light emission from the sample.

2. The method of claim 1, wherein the receiving device further comprises a plurality of vacuum ports.

3. The method of claim 1, wherein the vacuum port is configured to provide sufficient vacuum pressure to ensure a maximum physical contact between the solid support and the platform.

4. The method of claim 1, wherein the receiving device further comprises a fluidic system configured to provide one or more fluids to the solid support.

5. The method of claim 1, further comprising providing a constructive interference with the magnet by orienting the magnet.

6. The method of claim 1, wherein the vacuum port and the magnet prevents a significant movement of the solid support.

7. The method of claim 1, wherein the platform further comprises a visible light absorbing coating, or an ultraviolet light absorbing coating, or an infrared light absorbing coating, or a combination thereof.

8. The method of claim 1, wherein the receiving device further comprises a thermoelectric heating element configured to modulate temperature of the platform.

9. The method of claim 8, wherein the thermoelectric heating element is a Peltier device.

10. The method of claim 3, wherein the sufficient vacuum pressure is less than about 760 torr.

11. The method of claim 1, wherein said receiving device further comprises a circuit board.

12. The method of claim 11, wherein the solid support further comprises an electronically erasable programmable read only memory chip, and the circuit board is configured to contact to the electronically erasable programmable read only memory chip.

13. The method of claim 11, wherein said circuit board is configured to store information and to process the information, and/or to modulate a radio-frequency signal and demodulate the radio-frequency signal.

14. The method of claim 1, wherein the fluorescently labeled nucleotide comprises a 3' reversible terminator.

15. The method of claim 1, wherein the fluorescently labeled nucleotide forms part of a nucleic acid molecule.

16. The method of claim 15, wherein the nucleic acid molecule is hybridized to a target polynucleotide.

17. The method of claim 1, wherein the sample further comprises a plurality of fluorescently labeled nucleotides.

18. The method of claim 17, further comprising adjusting a position of the solid support using the platform, and detecting a second fluorescently labeled nucleotide in the sample.

19. The method of claim 1, wherein the sample comprises four fluorescently labeled nucleotides, wherein each of the four fluorescently labeled nucleotides comprises a different fluorescent label.

20. The method of claim 1, wherein the receiving device further comprises an input port and an output port.

* * * * *